(12) United States Patent
Mehr

(10) Patent No.: US 9,734,513 B1
(45) Date of Patent: Aug. 15, 2017

(54) SYSTEM AND METHOD FOR ADVERTISING APPLICATIONS TO USERS WITHOUT REQUIRING THE APPLICATIONS TO BE INSTALLED

(71) Applicant: Alexander F. Mehr, San Francisco, CA (US)

(72) Inventor: Alexander F. Mehr, San Francisco, CA (US)

( * ) Notice: Subject to any disclaimer, the term of this patent is extended or adjusted under 35 U.S.C. 154(b) by 745 days.

(21) Appl. No.: 14/055,495

(22) Filed: Oct. 16, 2013

Related U.S. Application Data

(60) Provisional application No. 61/714,631, filed on Oct. 16, 2012.

(51) Int. Cl.
G06F 3/0484 (2013.01)
G06Q 30/02 (2012.01)
G06Q 30/06 (2012.01)

(52) U.S. Cl.
CPC ..... *G06Q 30/0241* (2013.01); *G06F 3/04842* (2013.01); *G06Q 30/0621* (2013.01)

(58) Field of Classification Search
CPC .......................... G06F 3/0481; G06F 3/04842
USPC ........................................................ 715/709
See application file for complete search history.

(56) References Cited

U.S. PATENT DOCUMENTS

| 5,577,186 A * | 11/1996 | Mann, II | G09B 19/0053 715/201 |
| 7,124,357 B1 * | 10/2006 | Orr | G06F 17/24 707/999.104 |
| 8,307,283 B1 * | 11/2012 | O'Neill | G09B 19/0053 715/705 |
| 8,402,492 B2 * | 3/2013 | Amira | H04N 7/17318 345/418 |
| 8,566,718 B1 * | 10/2013 | O'Neill | G09B 19/0053 700/234 |
| 2007/0060225 A1 * | 3/2007 | Hosogai | A63F 13/10 463/1 |
| 2007/0226254 A1 * | 9/2007 | Moraveji | G06F 17/24 |
| 2011/0052144 A1 * | 3/2011 | Abbas | G11B 27/034 386/240 |
| 2012/0209586 A1 * | 8/2012 | Mieritz | G06F 9/455 703/22 |
| 2012/0293558 A1 * | 11/2012 | Dilts | G09G 5/24 345/676 |
| 2013/0129316 A1 * | 5/2013 | Dontcheva | H04N 5/76 386/241 |
| 2013/0204919 A1 * | 8/2013 | Kitazato | H04N 21/4325 709/201 |
| 2013/0232485 A1 * | 9/2013 | Murray | G06F 9/4445 718/1 |
| 2014/0179428 A1 * | 6/2014 | Miura | A63F 13/12 463/31 |

* cited by examiner

*Primary Examiner* — Reza Nabi
*Assistant Examiner* — Daniel Rodriguez
(74) *Attorney, Agent, or Firm* — Innovation Partners; Charles E. Gotlieb

(57) ABSTRACT

A system and method allows a user to view a movie demonstrating an application via a user device and then have operation of the application simulated on a server, with application input and output forwarded between the server and the user's device. Operation of the application begins from a point relevant to the time of the movie the user was viewing. Operation of the application can also be started from one such point via a link available in a robots.txt-type file.

18 Claims, 3 Drawing Sheets

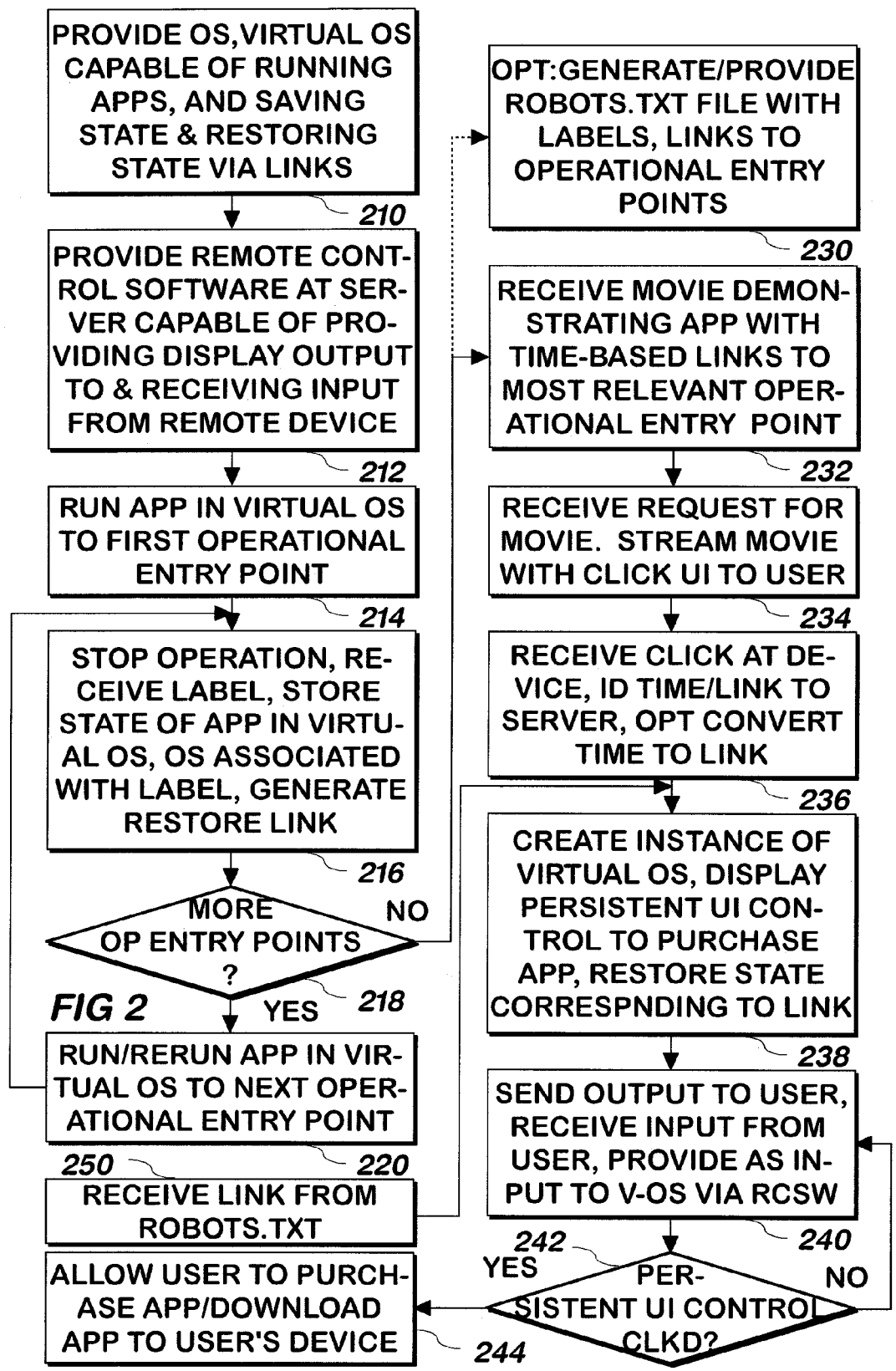

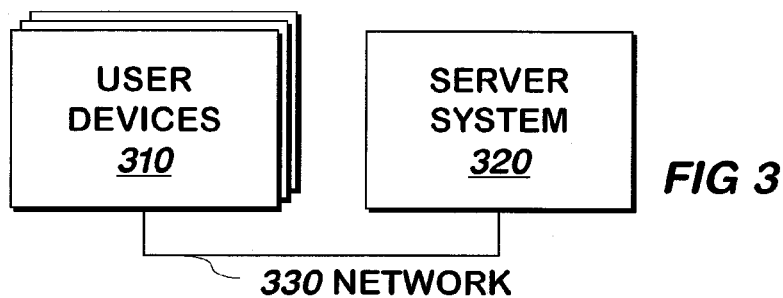
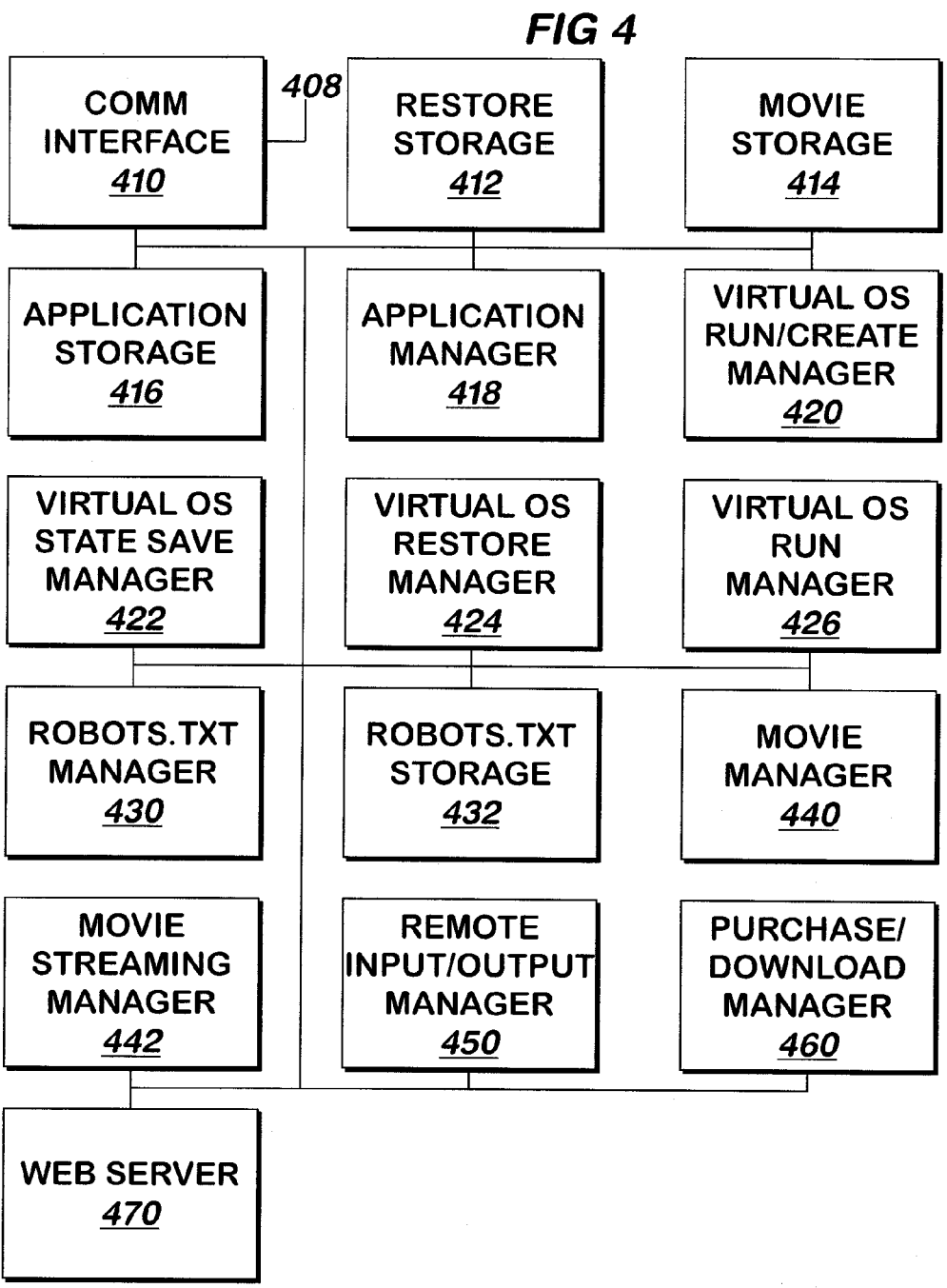

SYSTEM AND METHOD FOR ADVERTISING APPLICATIONS TO USERS WITHOUT REQUIRING THE APPLICATIONS TO BE INSTALLED

RELATED APPLICATION

The application claims the benefit of U.S. provisional patent application Ser. No. 61/714,631 entitled, "Method and Apparatus for Advertising Applications to Users Without Requiring the Applications to Be Installed" filed by Alex Mehr on Oct. 16, 2012 and is hereby incorporated by reference in its entirety.

FIELD OF THE INVENTION

The present invention is related to computer software and more specifically to computer software for advertising applications.

BACKGROUND OF THE INVENTION

Applications may be installed onto a device, such as a smart phone or tablet computer system, to an account on a social network, or elsewhere. An application is a program that undergoes some form of installation before it can be run by the user. Installation may include physically adding it to a device on which it did not exist before, may include permitting it to obtain information about a user who did not grant such permission before, or both.

A certain amount of overhead may be required to install an application, and some users may be reluctant to perform such overhead. Some organizations such as Amazon.com allow a user to try an application for a cell phone or tablet computer system by running the application on their computer system and then forwarding the input and output between the server and the user's device. Such arrangement is suboptimal. What is needed is a system and method for allowing a user to experience an application before installing the application.

SUMMARY OF INVENTION

A system and method allows an operator to operate an application to various desired points, and to mark such application points. At each marked point, referred to as an operational entry point, the state of operation of the application and operating system are recorded in a manner sufficient to allow restoration of the application state to that same point so that the application can resume normal operation from that point.

Links corresponding to each operational entry point may be generated as the operational entry points are identified (or the links may be generated at a later time), and such links may be stored associated with descriptive information received from the operator that describes each operational entry point for use as described below.

A promotional video may be recorded that includes scenes in which operation of the application are demonstrated and/or described. Time periods of the video are then defined, and each time period is mapped to the operational entry point most closely corresponding to the content of the video during that time period.

A user may then view the video, for example, by streaming it to a mobile or other device. The video includes a user interface element that allows the user to start operating the application itself. When the user operates such user interface element, the video stops and the application operates from the operational entry point. In one embodiment, the application operates on a server, but the output of the server is forwarded to the device on which the user was watching the video. The user may provide input to the application running on the server from the user's device and such input is forwarded to the application on the server.

Thus, the user may view the video demonstrating and/or describing operation of the application, and then switch from viewing the video to operating the application, which may be performed by providing input to the application from the user's device and receiving output from the application, while the application is running on a server, avoiding the installation of the application on the user's device but allowing the user to run the application, though remotely. The user may then install the application on the device the user used to remotely operate the application, either for free or after purchasing it. In one embodiment, a user interface element displayed on the video also allows the user to purchase the application before operating it, if desired.

The links to the operational entry points and the descriptive information associated with such links may be stored as part of a conventional robots.txt file to allow such links to the operational entry points to be catalogued and searchable by conventional search engines. Clicking the link resulting from a search or other conventional link discovery mechanism will allow the user to start operating the application from that operational entry point, by simulating operation of the application on the server and forwarding output to, and forwarding input from, a user's device to the application running on the server, to allow such users to also operate the application without installing it on their devices.

BRIEF DESCRIPTION OF THE DRAWINGS

FIG. 2 is a flowchart illustrating a method for advertising applications using interactive demonstration movies and operational entry points according to one embodiment of the present invention.

FIG. 3 is a block schematic diagram of a system for advertising applications using interactive demonstration movies and operational entry points according to one embodiment of the present invention, including a server system and one or more user devices.

FIG. 4 is a block schematic diagram of the server system of FIG. 3 shown in more detail according to one embodiment of the present invention.

DETAILED DESCRIPTION OF A PREFERRED EMBODIMENT

Figure 1:
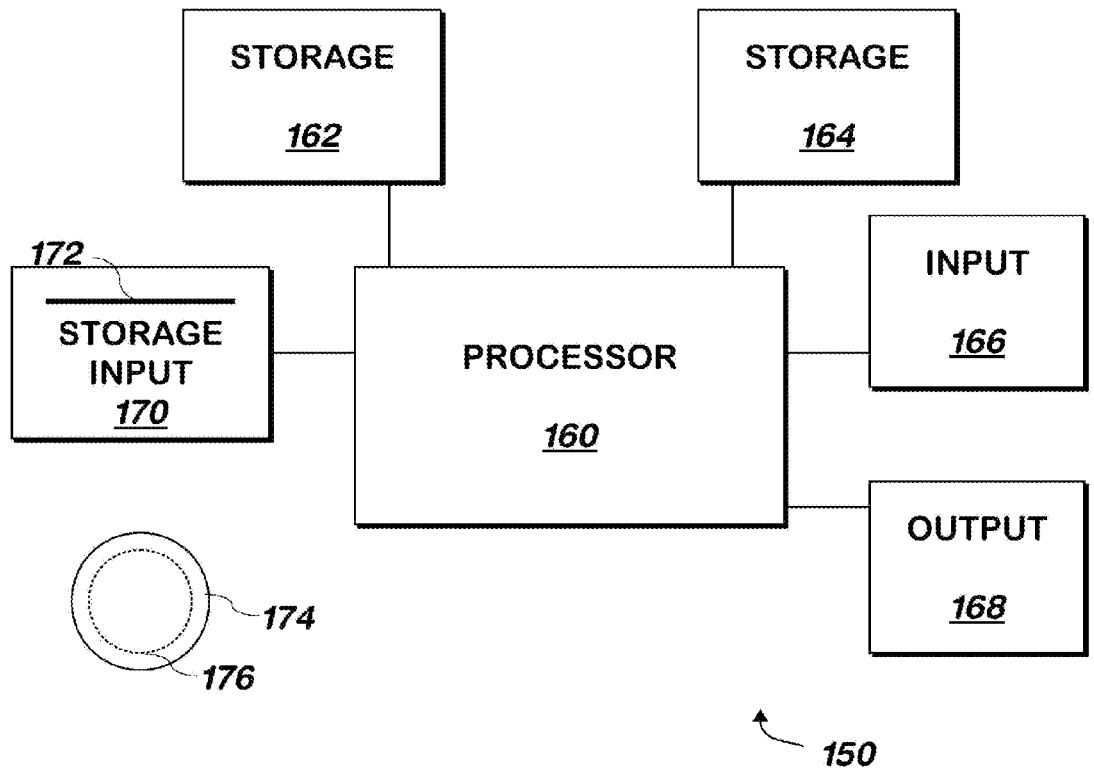
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID OS commercially available from GOOGLE, INC. of Mountain View, Calif. Various computer systems may be employed, with the various computer systems communicating with one another via the Internet, a conventional cellular telephone network, an Ethernet network, or all of these.

FIG. 2 is a flowchart illustrating a method for advertising applications using interactive demonstration movies and operational entry points according to one embodiment of the present invention.

Provide Operating System, Virtual Operating System Capable of Running Applications, and Saving State and Restoring State Via Links.

Referring now to FIG. 2, an operating system is provided, and a virtual operating system is also provided which is capable of running applications and also saving state information on command and restoring state information via links 210. In one embodiment, the operating system provided may be a server operating system running on a server, and the virtual operating system may be an operating system run by the server operating system which is used to run smartphone applications such ANDROID or IPHONE applications or applications written for a conventional social network such as FACEBOOK or any other system that runs application programs that are not written for the server operating system. To run applications not written for the server operating system, the virtual operating system translates or converts commands written for an the operating system for which the application was written into commands recognizable to the server operating system.

In one embodiment, state information corresponding to the virtual operating system is saved in its entirety at the operating system in a manner similar to the manner in which state information corresponding to all registers and all storage in use by the operating system is saved at an operating system when the operating system is processing a conventional interrupt request.

Provide Remote Control Software at Server Capable of Providing Display Output to and Receiving Input from Remote Device.

Remote control software is provided at a server that is capable of providing display output of the server to a remote device and receiving and forwarding to the server input from a remote device 212. In one embodiment, the remote device may be any remote device, such as an ANDROID smartphone or an APPLE IPHONE or a desktop computer or any other device. Display output corresponding to the application running in the virtual operating system run by the server operating system may be piped or otherwise redirected by the remote control software at the server to display the display output at the remote device display, and such remote control software may also receive and redirect any input from the remote device, such as any remote device keyboard and/or remote device pointing device input, to the application running in the virtual operating system via the server operating system.

Run Application in Virtual Operating System to First Operational Entry Point.

Applications to be advertised as described herein may be received and stored at any time. Any such application, written for any operating system such as the ANDROID OS or APPLE OS or any operating system or social network platform such as FACEBOOK may be run by a user using the server and virtual operating system. The application is run 214 in the virtual operating system (e.g. a virtual IPHONE operating system) running on the server to a first operational entry point. To run the application, application commands may be translated or converted in the virtual operating system into corresponding commands recognizable at the server operating system.

In one embodiment, the application is run in the described manner by an expert or advanced user (one with much more knowledge of the application than a novice user) to an operational entry point defined herein as any specific state corresponding to an application that may be caused to occur when the application is operating in a manner conventional to the application. For example, an operational entry point corresponding to a game application may be the very beginning of the third level of the game, or it may be a particularly interesting portion of a game, such as one a novice user would have difficulty reaching, or could be a point in an application that allows the user to view an interesting feature that could require a significant amount of time to set up, such that someone casually interested in the application would be unlikely to want to set up. Details corresponding to an operational entry point may include avatar details (e.g. appearance, capabilities, skill level, current status of an avatar) for an application including one or more avatars that the user may manipulate, level details (e.g. difficulty, objectives, rules and/or limitations corresponding to a level) for an application including multiple stages or levels, settings details (e.g. display settings, background setting, controls settings, rules and/or limitations), and/or any other information corresponding to an application state. In one embodiment, the application is run by the designated user to the operational entry point in a manner conventional to the application. For example, the application may be a puzzle game application including thirty sequentially-numbered puzzles, the level of difficulty of each puzzle increasing with its corresponding level number, and two different avatars, each having a specific set of skills. An operational entry point corresponding to such a puzzle game application may be defined as the state of the application in which Avatar A is used to attempt to solve Puzzle Level 15. In one embodiment, such operational entry point may be caused to occur by the designated user by running the application, selecting Avatar A in a manner conventional to the puzzle game application (e.g. from an avatar selection screen provided prior to Puzzle Level 1), and successfully completing Puzzle Levels 1-14 using the selected avatar in a manner conventional to the puzzle game application.

Stop Operation, Receive Label, Store State of Application in Virtual Operating System, Operating System Associated with Label, and Generate Restore Link.

When the state corresponding to the first operational entry point has been caused to be occurring in the running application in a manner conventional to the application, operation of the application is halted, entry point label information is received, and state information corresponding to the application running in the virtual operating system and state information corresponding to the virtual operating system running on the operating system is captured and stored as described herein associated with the received entry point label information 216. In one embodiment, operation of the application may be halted by the designated user, such as by pressing a save state button or link or pausing the application in any other manner, and entry point label information, which may include an application name, any words describing the application state at the operational entry point (e.g. "Application Alpha, Entry Point A15" or "Application Beta, Avatar A, Level 15"), or any other tag words or other words which may relate to the application and/or the newly created operational entry point, may be received, such as via text input provided by the designated user.

In one embodiment, virtual operating system state information and operating system state information are stored in a manner similar to the manner in which state information is stored when an operating system processes an interrupt request, along with some or all variables of any or all of the application, virtual operating system, and operating system. However, instead of the use of temporary structures such as a stack, disk or memory storage is used to store such state information statically. Such state information may be stored associated with any received entry point label information.

Additionally as a part of step 216, one or more unique restore links may be generated to identify the saved state of the application 216. In one embodiment, the restore link may allow the designated user, or any other user to begin running the application, or to jump to the state in the application, at exactly the state at which operation of the application was halted and saved by the designated user. Such restore link may also be stored associated with the saved state information and received entry point label information.

If More Operational Entry Points, Run/Rerun Application in Virtual Os to Next Operational Entry Point.

Multiple operational entry points may be created at different locations in the application or using different values of variables (e.g. different avatars) or both. If there are any additional operational entry points at which state information is to be captured and stored 218, then operation of the application may be resumed from the state that operation was previously halted, or operation of the application may be restarted from another state such as from the beginning state of the application or state of the application at the beginning of a level or section, or from any other state corresponding to the application, until the next operational entry point is caused to occur 220. The user may provide input to the application to reach each of the operational entry points as desired or required to reach them via normal operation of the application under the virtual operating system. In one embodiment, operational entry points for an application may include sequential entry points which are caused to occur chronologically (e.g. Level 1, Level 3, then Level 5 for an application including sequential levels or sections), or they may include alternate or diverging entry points that caused to occur by selecting different options at any given point of divergence (e.g. Level 2 using Avatar A, Level 2 using Avatar B, and Level 2 using Avatar C, such as for an application including more than one avatar), or the operational entry points may include both sequential and divergent entry points, or they may include any other entry points or combination of entry points reached in any other manner.

When the next operational entry point corresponding to the application has been caused to occur, the method continues at step 216 at such next operational entry point.

If No More Operational Entry Points, then Optionally Generate and/or Provide Robots.Txt File with Labels and Links to Operational Entry Points.

If no additional operational entry point exists for which corresponding state information is to be captured and stored 218, then a robots.txt file including some or all of each entry point label and corresponding restore links may optionally be generated and/or provided 230. The method continues at step 232. If no robots.txt file is generated, step 232 follows the "NO" branch of step 213 as shown in the Figure.

Receive Movie Demonstrating Application with Time-Based Links to Most Relevant Operational Entry Point.

At step 232, a movie demonstrating or describing features of the application is received, associated with any number of movie time-based restore links corresponding to the same application. Any number of movies may be received for each of any number of applications. In one embodiment, the movie demonstrating the application may be a promotional movie displaying any number of examples of what the application may include, such as display output video of the application display as it is running, and/or it may include any other type of promotional video demonstrating features of the application. The movie demonstrating the application may be a FLASH movie or other movie generated in such a manner that it includes the ability to identify the track time of the movie at any given point during playback of the movie or identify, in one embodiment, one or more operational entry point links, which have been generated to restore the state of the virtual operating system at a specified operational entry point corresponding to the application as described above, may be received. Each restore link received may correspond to a unique movie track time period, or movie track time interval. In one embodiment, the operational entry point corresponding to a received restore link is the operational entry point most relevant to the content displayed on the demonstration movie at the movie track time, or in the track time interval, specified for such link. In one embodiment, the movie includes or corresponds to screen shots demonstrating or describing the feature or features the user would see at each operational entry point during the time period corresponding to the link for that operational entry point.

Receive Request for Movie, Stream Movie with Click User Interface to User.

At any time, a request to view the demonstration movie may be received from a user ("testing user"), and the requested demonstration movie may be streamed to such user, along with a suitable user interface to receive any click or other request for the application to be made available to the other user as described herein from the testing user during the streaming of the demonstration movie 234. In one embodiment, a request to view the demonstration movie may be received at the server via any remote device as a click on a demo link corresponding to a specific demonstration movie. The demo link may be provided at any online "app store" or any other website or online retailer selling or advertising the application.

In one embodiment, the requested demonstration movie is streamed to the testing user in a conventional manner at the remote device, and a click user interface is also provided to allow the user to click on the movie display (e.g. tap the touchscreen, for example, if the remote device is a smartphone or tablet computer) at any time during the stream.

Receive Click at Device, Identify Time/Link to Server, and Optionally Convert Time to Link.

If at any point during the streaming of the demonstration movie the testing user clicks the displayed movie, the testing user's click is received at the user's remote device via the click interface, and the track time corresponding to the streamed demonstration movie when the click was received and/or the most relevant restore link corresponding to such track time is identified to the server 236. In one embodiment, if the user click is identified to the server as a track time corresponding to the demonstration movie, then the movie track time identified may optionally be used at the server to identify the link to the most relevant operational entry point corresponding to such movie track time using a table of such information received with the movie in step 232.

Create Instance of Virtual Operating System, Display Persistent User Interface Control to Purchase Application, and Restore State Corresponding to Link.

An instance of the virtual operating system which may be used to run the application corresponding to the demonstration movie is created using the server operating system, a persistent user interface control to allow the user to purchase the application corresponding to the demonstration movie is displayed via the virtual operating system and the remote control system, and state information corresponding to the restore link of the most relevant operational entry point corresponding to the received user click is restored via the virtual operating system 238. In one embodiment, the persistent user interface control to allow the user to purchase the application may be any persistently displayed icon or semitransparent icon overlaid on the display or any other suitable user interface element allowing the user to request to purchase the application at any time.

In one embodiment, to restore the system state to the state specified by the link to the operational entry point most relevant to the received user click, state information corresponding to the virtual operating system running in the operating system is restored, and state information corresponding to the application running in the virtual operating system is also restored. The application is then run from that point under the virtual operating system.

Send Output to User, Receive Input from User, Provide as Input to Virtual Operating System Via Remote Control Software from Above.

Application output corresponding to the virtual operating system on the server operating system is sent to the testing user's remote device via the remote control software on the server operating system, any input provided by the user is received at the user's remote device, and any input received at the user's remote device is provided as input to the application via the virtual operating system running on the server operating system also via the remote control software described above in step 212 240. At any time during the stream of the demonstration movie, the testing user may click the persistent user interface control displayed which allows the testing user to purchase the application demonstrated via the demonstration movie 240.

If Persistent User Interface Control not Clicked.

If the persistent user interface control displayed to the user is not clicked by the testing user 242, then the method continues as described at step 240 until the user clicks the user interface control, until the application terminates, or until the end of a timeout period, whichever occurs first.

If Persistent User Interface Control Clicked, then

If the persistent user interface control to allow the user to purchase the application corresponding to the demonstration movie is clicked by the testing user at any time 242, then the testing user is allowed to purchase the application and/or download a production version of the application to the user's device in a conventional manner 244.

Receive Links from Robots.Txt.

In one embodiment, a link to restore the state of the application running in the virtual operating system and the operating system may be identified and/or received via a click received from a testing user during the stream of a demonstration movie as described above, or the link to restore the virtual operating system and server operating system states corresponding to the operational entry point may be received via the robots.txt file optionally generated, provided, and stored as described above, such as via a conventional search engine result of a search engine that read the robots.txt file 250. The search engine result may be generated via conventional relevance analysis techniques between any user-specific search input and the label information corresponding to the link. Conventional advertising relevance techniques may be used to display links to the user as well or instead. The method continues at step 238.

System.

FIG. 3 is a block schematic diagram of a system for advertising applications using interactive demonstration movies and operational entry points according to one embodiment of the present invention.

FIG. 4 is a block schematic diagram of a representative server system 320 shown in more detail according to one embodiment of the present invention.

The system of FIG. 3 includes any number of user devices 310, each of which may include any conventional smart phone, tablet computer, personal computer, or other conventional device, and server system 320, which may include a conventional web server system. All systems 310, 320 communicate via network 330, which may include a conventional Ethernet network, the Internet, or both.

Referring now to FIGS. 3 and 4, server system 320 includes a conventional communication interface 410 coupled to network 330, which includes a conventional TCP/IP compatible communication interface, and all communications in and out of server system 320 are made via its conventional input/output 408 of such communication interface 410.

At any time, application manager 418 may receive any number of application programs, such as smartphone or other mobile applications or social network applications (e.g. FACEBOOK applications), as described above, and application manager 418 stores any received applications in application storage 416. In one embodiment, the applications do not run natively on the operating system of server 340. In one embodiment, application manager 418 may receive applications from a system administrator, and application manager 418 may receive each application as one or more versions of the application, including a version to run as a demonstration version as described herein and/or a version which may be downloaded by a user to a user device 310 (or both versions may be the same), and application manager 418 may receive each application with a corresponding application name and a corresponding purchase amount or amount to charge a user wishing to purchase the downloadable version of the application as described herein. Application manager 418 may receive applications that are written for any number of different operating systems (OS), such as applications written for an ANDROID OS or APPLE OS or any other operating system or social network platform as described above, and application manager 418 may store information corresponding to each application received in application storage 416 associated with a unique application identifier, as well as an indication of the operating system for which each application is written and the version type of the application as described above. All storage elements described herein such as application storage 416 may include conventional memory and/or disk storage and may include a conventional database.

A user, such as the designated expert user described above, may request to run an application and create one or more operational entry points as described above. In one embodiment, the designated user may request to run the application using a virtual operating system on server system 320, and the designated user may request to run any application written for any operating system, which may be different than the operating system running on server system 320, via the virtual operating system. As described above, the virtual operating system may be an operating system run by the server operating system which is used to run (e.g. simulate by translating operating system calls and other operating system affection instructions to those of the native server operating system) smartphone applications such ANDROID or IPHONE applications or applications written for a conventional social network such as FACEBOOK or any other system that runs application programs that are not written for the native server operating system. When the designated user requests to run application written for a different operating system than the server operating system, as described above, the native operating system (not shown) of server system 330 receives the request, which receives the application identifier corresponding to the application the designated user is requesting to operate (and optionally an indication of the operating system for which such application is written), and the native server operating system runs virtual operating system run/create manager 420. In one embodiment, expert user may indicate to virtual operating system run/create manager 420 which operating system the requested application is written.

Virtual operating system run/create manager 420 receives the application identifier (and optionally the indication of the operating system for which the application is written), retrieves the application corresponding to the received application identifier in application storage 416, and runs the retrieved application in a manner conventional to the application and the virtual operating system corresponding to the one specified. In one embodiment, as described above, virtual operating system run/create manager 420 translates any application commands written for or affecting the intended operating system of the application into commands that are recognizable to the server operating system running on server system 320 and also translates any response from the server operating system into a format recognizable to the application in the virtual operating system.

The designated user may request to create an operational entry point at any time when virtual operating system run/create manager 420 is running the application as described above, such as by clicking or pressing a control or button to create an operational entry point which may be provided by virtual operating system run/create manager 420. If the user clicks or presses such control to create the operational entry point, virtual operating system state save manager 422 receives the request, signals virtual operating system run/create manager 420 to halt operation of the application, and creates the operational entry point as requested.

Virtual operating system run/create manager 420 receives the signal to halt operation of the application and complies as described above.

To create the operational entry point as requested, virtual operating system state save manager 422 saves state information corresponding to the application in the virtual operating system and the server operating system at the state of operation of the application at which the user requested to create such operational entry point. In one embodiment, virtual operating system state save manager 422 generates an interrupt request to the microprocessor running the virtual operating system, which such microprocessor receives, causing it to automatically save the state of its registers in a manner conventional to interrupt processing techniques. Virtual operating system state save manager 422 may retrieve and save to restore storage 412 such virtual operating system state information automatically saved by the microprocessor that is processing the interrupt request, along with the file name of the application that was running, and virtual operating system state save manager 422 may also save in restore storage 412 any state information corresponding to the state of the server operating system when such interrupt request was generated to the virtual operating system run by the server operating system, which virtual operating system state save manager 422 may identify and retrieve from the memory or disc storage used exclusively by the server operating system. Virtual operating system state save manager 422 saves all such state information corresponding to the operational entry point created by the designated user in restore storage 412 associated with the application identifier corresponding to the application in which the operational entry point was created. If the application runs in multiple non-native operating systems, each such version may have its own application identifier.

Additionally, virtual operating system state save manager 422 may provide to the designated user suitable user interface elements to allow the designated user to provide entry point label information corresponding to the newly created operational entry point as described above. The user provides any entry point label information, described above, such as by entering and submitting text information including keywords that may identify or otherwise describe the newly created operational entry point, and virtual operating system state save manager 422 receives such information submitted by the designated user and saves it in restore storage 412 associated with the application identifier and state information saved corresponding to the newly created operational entry point described above.

In one embodiment, virtual operating system state save manager 422 also generates a restore link, described above, corresponding to the operational newly entry point created and stored in restore storage 412, and also stores such generated restore link in restore storage 412 associated with the state information, application identifier, and any entry point label information saved corresponding to such operational entry point. In one embodiment, virtual operating system state save manager 422 may provide an indication to the designated user when state information, application identifier, entry point label information, and restore link corresponding to the newly created operational entry point has been saved.

In one embodiment, virtual operating system state save manger 422 may optionally provide entry point label information and the restore link to robots.txt manager 430 to generate and/or provide a robots.txt file as described above. Virtual operating system state save manager 422 may optionally provide such information to robots.txt manager 430 each time an operational entry point is created as described herein, or at specific points during the process described, such as the point when all of any operational entry points corresponding to one application have been created as described in more detail above and below, or at any other time or times. Such point may be specified by the designated user at or near the time he or she provides the robots.txt information for the last operational entry point, as described above.

In one embodiment, when the operational entry point requested by the designated user has been created as requested, the designated user may provide an indication to resume operation of the application in the virtual operating system at the state of operation at which the application was previously halted, or the user may provide an indication to restart operation of the application in the virtual operating system at an alternate state, such as at the beginning state of operation of the application, or the user may provide an indication that no additional operational entry points are to be created corresponding to such application in the virtual operating system, or the user may provide any other indication as described above.

If the designated user provides an indication to resume operation of the application in the virtual operating system from the state of operation at which the application was previously halted as described above, such as by pressing a provided resume operation control, virtual operating system state save manager 422 may receive such indication from the user and signal virtual operating system run/create manager 420 to resume operation as indicated.

If the user provides an indication to restart operation of the application in the virtual operating system at an alternate state of operation as described above, such as by pressing or selecting a provided restart operation control, virtual operating system state save manager 422 may receive such indication from the user and signal virtual operating system run/create manager 420 to restart operation of the application from the beginning state of operation as indicated.

Virtual operating system run/create manager 420 receives any indication from virtual operating system state save manager 422 to resume operation of the application, or to restart operation of the application, and virtual operating system run/create manager 420 resumes or restarts operation of the application accordingly.

If the user provides an indication that no additional operational entry points are to be created corresponding to the application in the virtual operating system as described above, such as by pressing or selecting the appropriate operation control provided, virtual operating system state save manager 422 may receive such indication from the user and may optionally signal robots.txt manager 430 with the application identifier corresponding to the application in the virtual operating system. In one embodiment, robots.txt manager 430 may receive the signal and application identifier from virtual operations system state save manager 422 and optionally generate and provide the previously described robots.txt file including any entry point label information and restore link information corresponding to each of any operational entry points associated with the received application identifier in restore storage 412. In one embodiment, robots.txt manager 430 stores any robots.txt file generated in robots.txt storage 432 associated with the received application identifier. Robots.txt manager 430 may optionally append the robots.txt file with one operational entry point link at a time as it is generated or with all entry point links corresponding to each application or in any other manner.

Any number of designated users may create any number of operational entry points as described herein for any number of applications. Additionally, any number of promotional or advertisement movies, which may be FLASH movies as described above, demonstrating an application, or demonstrating features of an application, may be created. Movie manager 440 may receive any number of such movies which include a built-in click user interface to allow the movie to detect any user clicks on the movie or on any other user interface control elements displayed with the movie as described herein during the display of the movie and also allowing the movie to identify the movie track time corresponding to any clicks received. In one embodiment, movie manager 440 receives any such demonstration movie along with any number of time-based restore links corresponding to previously defined operational entry points demonstrating features of the corresponding application. As described above, movie manager 440 may receive each of any restore links associated with a specified track time or time period during the corresponding movie, such that content displayed during such movie at the specified track time or time period corresponds to a restore link which may be used to initiate operation of the application on the virtual operating system at the most relevant operational entry point created for such application at such specified time as described above. In one embodiment, movie manager 440 stores the movie demonstrating the application and any time-based restore links in movie storage 414 associated with a unique movie identifier and the application identifier in application storage 416 which corresponds to the application for which the demonstration movie is received.

A user using user device 310, for example, a tester user as described above using a personal computer system or smartphone or tablet computer, may request to view the demonstration movie, such as by clicking a link to do so provided at an "app store" or any other retailer or advertiser of applications. If a tester user requests to view a demonstration movie using user device 310, movie streaming manager 442 receives the request to view the demonstration movie from the web browser on user device 310, along with the movie identifier corresponding to the requested movie, which may be imbedded or encoded in the link clicked by the user, and movie streaming manager 442 provides the requested movie to the requesting browser in a conventional streaming manner including the click user interface elements to detect, such as via FLASH or HTML5 capabilities enabled in the user's browser, any clicks provided by the user during the display of the movie as described above. To stream the movie to the user with the click user interface, movie streaming manager 442 may retrieve the demonstration movie, or parts of the demonstration movie, corresponding to the received movie identifier in movie storage 414.

If at any point the user clicks the screen or a designated portion of the screen of user device 310 during the display of the movie, user device 310 receives such click via the click user interface described, and the movie is programmed to identify the movie track time and/or the restore link corresponding to the received click and provides such information to virtual operating system restore manager 424 of server system 320. In one embodiment, user device 310 may identify and provide the movie track time at which the click is received along with the movie identifier corresponding to the movie for which the user click was received, which virtual operating system restore manager 424 may receive and use to identify the restore link corresponding to such received information in movie storage 414. In one embodiment, user device 310 may identify the restore link corresponding to such received click and provide the restore link to virtual operating system restore manager 424, which receives it.

In one embodiment, when such link is received, virtual operating system restore manager 424 may cause the stream of the demonstration movie which is being displayed when a user request to test run an application is received to halt to operate and display (via remote input/output manager 450) the application in the virtual operating system. In one embodiment, virtual operating system restore manager 424 may cause the user's browser to open a new window or tab to display the operation the application as described herein and below, or virtual operating system restore manager 424 may cause the user's browser to display only the operation of the application (e.g. in the same window or tab, replacing the movie), or it may cause the browser on user device 310 to display the operation of the application in the virtual operating system in any other manner.

When virtual operating system restore manager 424 receives or otherwise identifies the restore link corresponding to the user click, it instructs the operating system on server system 320 to create an instance of the virtual operating system by notifying virtual operating system run manager 426 with the restore link. The operating system receives any such command or commands and complies.

Virtual operating system run manager 426 receives the signal and restore link from the operating system and runs the application specified by the restore link at the operational entry point specified by the restore link in the virtual operating system as described above. To run the application as specified in the virtual operating system, virtual operating system run manager 426 may identify saved state information corresponding to the received restore link in restore storage 412 and restore the saved state of the application in the virtual operating system and in the operating system in a manner similar to the conventional manner in which saved state information is restored in processing conventional interrupt requests.

In one embodiment, virtual operating system run manager 426 signals remote input/output manager 450 to pipe or otherwise provide any output from the application in the virtual operating system to user device 310, as described above, and provides the user device 310, IP address, received when the user clicked the click user interface. Remote input/output manager 450 receives the signal and IP address and issues and provides a handle or other session identifier to virtual operating system run manager 426. Virtual operating system run manager 426 receives such handle and provides all output corresponding to the application running in the virtual operating system to remote input/output manager 450 along with the previously received handle. Using conventional remote control or remote desktop techniques, remote input/output manager 450 sends all display output corresponding to the application received from virtual operating system run manager 426 to user device 310 as described above.

In one embodiment, virtual operating system run manager 426 also signals remote input/output manager 450 along with the session handle to persistently display a user interface control to allow the user to purchase the full downloadable version of the application that is currently running in the virtual operating machine, as described above. When virtual operating system run manager 426 signals remote input/output manager 450 with the issued session handle, the IP address corresponding to the user device 310 on which to display the persistent user interface control, and the application identifier corresponding to the application that the user may purchase via the persistently displayed user interface control, remote input/output manager 450 receives the signal, handle, IP address, and application identifier, and remote input/output manager 450 persistently displays the user interface control to allow the user to purchase the application that the user is testing as described above. In one embodiment, to display such persistent user interface control, remote input/output manager 450 may build and display a link to allow the user to purchase the application, which specifies purchase/download manager 460 and includes the received application identifier.

If the user provides any input for the application running in the virtual operating system from user device 310, remote input/output manager 450 receives any such user input from user device 310 and redirects the received user input to the application in the virtual operating system via virtual operating system run manager 426 as described above using conventional remote control techniques.

If the user requests to purchase the downloadable version of the application at any time by clicking the user interface control persistently displayed on user device 310 via remote input/output manager 450 as described above, the browser of user device 310 identifies the application identifier corresponding to the received click via its FLASH or HTML5 capabilities and requests a web page from purchase/download manager 460 to allow the user to purchase the downloadable version of the application corresponding to the received application identifier. Purchase/download manager 460 receives the request and the application identifier, and purchase/download manager 460 may identify the amount to charge the user to purchase the application associated with the received application identifier in application storage 416. In one embodiment, purchase/download manager 460 builds and provides to the user a web page including the identified amount to charge the user to purchase the requested application and suitable user interface elements to allow the user to provide any purchase details information, for example, the user's credit card information, or the user's log in information corresponding to an account linked to a previously authenticated payment method, or any other information, and return it to the user's browser in response. The user provides such information and purchase/download manager 460 receives it. In one embodiment, purchase/download manager 460 may attempt to authenticate any purchase details information received from the user prior to allowing the user to download the requested application, such as by attempting to validate the user's credit card information or log in information, or by charging the specified purchase amount to the user's credit card or other payment source in a conventional manner. If the user's purchase details information is authenticated, then purchase/download manager 460 provides the downloadable version of the application corresponding to the received application identifier from application storage 416, which the user may download.

Additionally as described above, at any time a user may also request to restore the state of the virtual operating system and the state of the server operating system at a specified operational entry point corresponding to an application by clicking a link displayed as a conventional search engine result for a search engine that has crawled or read the optionally provided robots.txt file as described above. When the user clicks such a link corresponding to a search engine result, which may be generated via conventional relevance analysis techniques between any user-specific search input and the label information corresponding to the link or displayed to the user using conventional advertising relevance techniques as described above, the user's browser may request a web page from web server 470 via the restore link clicked. In one embodiment, web server 470 receives the requested link and signals virtual operating system restore manager 426 with received link, which virtual operating system restore manager 426 receives and processes as described above to run the application from the operational entry point corresponding to the link.

What is claimed is:

1. A computer-implemented method of allowing a user to operate an application to be demonstrated, comprising:
   establishing a plurality of operational entry points comprising information used to restore operation of the application to be demonstrated from a plurality of different points in the application;
   providing a set of images from a display of the application to be demonstrated, the images demonstrating operation of the application;
   associating at least some of the set of images with different ones of the operational entry points that represent operation of the application to be demonstrated at least near a portion of the application being demonstrated by the respective image;
   causing the set of images to be displayed to the user that demonstrate the application while enabling operation of a user interface control that indicates the user wishes to operate the application;
   receiving from the user operation of the user interface control while at least one of the set of images is being displayed, to indicate the user wishes to operate the application;
   identifying one of the operational entry points by using the at least one of the set of images displayed when the user interface was operated and the at least one of the associations made using the associating step; and
   operating the application from the operational entry point identified, while allowing the user to view output of the application and provide input to the application, so as to demonstrate operation of the application to the user.

2. The method of claim 1, additionally comprising:
   receiving a request to purchase the application operating; and
   responsive to the request, installing the application on the user's device that was receiving the output of the application.

3. The method of claim 2, wherein the request is received by operating an additional user interface control displayed on the user's device with the output of the application.

4. The method of claim 1, additionally comprising:
   identifying a plurality of links, each link corresponding to a different operational entry point;
   providing the plurality of links in at least one file;
   receiving from an other user a request corresponding to one of the plurality of links; and
   operating the application from the operational entry point corresponding to the link, while allowing the other user to view output of the application and provide input to the application.

5. The method of claim 1, wherein the set of images comprises a movie.

6. The method of claim 1, wherein the establishing and associating steps are performed prior to any operation of the application requested by the user.

7. A system for allowing a user to operate an application to be demonstrated, comprising:
   a virtual operating system state save manager having an input operatively coupled for receiving information used to restore operation of the application to be demonstrated, the virtual operating system state save manager for providing at an output a plurality of operational entry points comprising information used to restore operation of the application to be demonstrated from a plurality of different points in the application, and identifiers of each of the plurality of operational entry points;
   a movie manager having an input for receiving information comprising a set of images from a display of the application to be demonstrated and for receiving an indication of at least some of the set of images with which an association with different ones of the operational entry points should be made, the movie manager for providing at an output the information comprising the set of images from the display of the application to be demonstrated, the images demonstrating operation of the application to be demonstrated, and for providing at the movie manager output a plurality of associations, each of the associations in the plurality associating at least some of the set of images with the identifiers of different ones of the operational entry points that represent operation of the application to be demonstrated at least near a portion of the application to be demonstrated being demonstrated by the respective image;
   a movie streaming manager having an input coupled to the movie manager output for receiving the information comprising the set of images, the movie streaming manager for causing via an output the set of images to be displayed to the user that demonstrate the application while enabling operation of a user interface control that indicates the user wishes to operate the application;
   a virtual operating system restore manager comprising a hardware processor coupled to a non-transitory memory and having an input for receiving from the user an indication of user operation of the user interface control while at least one of the set of images is being displayed, to indicate the user wishes to operate the application, and coupled to the movie manager output for receiving at least one of the associations, the virtual operating system restore manager for providing at an output an identifier of one of the operational entry points using the at least one of the set of images displayed when the user interface was operated to and at least one of the plurality of associations; and
   a virtual operating system run manager having an input coupled to the virtual operating system restore manager output for receiving the operational entry point identifier, and to the virtual operating system save state manager output for receiving the information used to restore operation of the application corresponding to said operational entry point identifier, the virtual operating system run manager for operating the application from the operational entry point identified, while allowing the user to view output of the application via an output and provide input to the application via the virtual operating system run manager input, thereby demonstrating the application to the user.

8. The system of claim 7, additionally comprising a purchase/download manager having an input coupled for receiving from the user a request to purchase the application operating, the purchase/download manager for, responsive to the request, installing via an output the application on the user's device that was receiving the output of the application.

9. The system of claim 8, wherein the request is received by operating an additional user interface control displayed on the user's device with the output of the application.

10. The system of claim 7:
additionally comprising:
  a robots.txt manager having an input coupled for receiving the plurality of operational entry points, the robots.txt manager for providing at an output to at least one file a plurality of links, each link corresponding to a different operational entry point; and
  a web server having an input coupled for receiving the at least one file, and for receiving from an other user a request corresponding to one of the plurality of links, the web server for providing at an output the identifier of the operational entry point corresponding to the link corresponding to the request; and
  wherein:
    the virtual operating system run manager input is coupled to the web server output for receiving the operational entry point identifier corresponding to the link; and
    the virtual operating system run manager is additionally for operating the application from the operational entry point corresponding to the link, while allowing the other user to view output of the application via an output and provide input to the application via the virtual operating system run manager input, thereby demonstrating the application to the other user.

11. The system of claim 7, wherein the set of images comprises a movie.

12. The system of claim 7, wherein: the virtual operating system save state manager provides the plurality of operational entry points at the virtual operating system save state manager output prior to any operation of the application requested by the user; and
the movie manager provides the plurality of associations at the movie manager output prior to any operation of the application requested by the user.

13. A computer program product comprising a non-transitory computer useable medium having computer readable program code embodied therein for allowing a user to operate an application to be demonstrated, the computer program product comprising
computer readable program code devices configured to cause a computer system to:
establish a plurality of operational entry points comprising information used to restore operation of the application to be demonstrated from a plurality of different points in the application;

provide a set of images recorded from a display of the application to be demonstrated, the images demonstrating operation of the application;
associate at least some of the set of images with different ones of the operational entry points that represent operation of the application to be demonstrated at least near a portion of the application being demonstrated by the respective image;
cause the set of images to be displayed to the user that demonstrate the application while enabling operation of a user interface control that indicates the user wishes to operate the application;
receive from the user operation of the user interface control while at least one of the set of images is being displayed, to indicate the user wishes to operate the application;
identify one of the operational entry points using the at least one of the set of images displayed when the user interface was operated and at least one of the associations made by the computer readable program code devices configured to cause the computer system to associate; and
operate the application from the operational entry point identified, while allowing the user to view output of the application and provide input to the application, so as to demonstrate operation of the application to the user.

14. The computer program product of claim 13, additionally comprising computer readable program code devices configured to cause the computer system to:
receive request to purchase the application operating; and
responsive to the request, install the application on the user's device that was receiving the output of the application.

15. The computer program product of claim 14, wherein the request is received by operating an additional user interface control displayed on the user's device with the output of the application.

16. The computer program product of claim 13, additionally comprising computer readable program code devices configured to cause the computer system to:
identify a plurality of links, each link corresponding to a different operational entry point;
provide the plurality of links in at least one file;
receive from an other user a request corresponding to one of the plurality of links; and
operate the application from the operational entry point corresponding to the link, while allowing the other user to view output of the application and provide input to the application.

17. The computer program product of claim 13, wherein the set of images comprises a movie.

18. The computer program product of claim 13, wherein:
the computer readable program code devices configured to cause the computer system to establish are operated prior to any operation of the application requested by the user; and
the computer readable program code devices configured to cause the computer system to associate are operated prior to any operation of the application requested by the user.

* * * * *